United States Patent
Kono et al.

(10) Patent No.: US 9,025,232 B2
(45) Date of Patent: May 5, 2015

(54) IMAGE-CAPTURING APPARATUS

(71) Applicant: Olympus Corporation, Tokyo (JP)

(72) Inventors: Takayuki Kono, Tokyo (JP); Shinpei Tomita, Tokyo (JP)

(73) Assignee: Olympus Corporation, Tokyo (JP)

( * ) Notice: Subject to any disclaimer, the term of this patent is extended or adjusted under 35 U.S.C. 154(b) by 337 days.

(21) Appl. No.: 13/718,803

(22) Filed: Dec. 18, 2012

(65) Prior Publication Data

US 2013/0155479 A1 Jun. 20, 2013

(30) Foreign Application Priority Data

Dec. 20, 2011 (JP) .................................. 2011-278680

(51) Int. Cl.
*G02B 26/08* (2006.01)
*G02B 21/06* (2006.01)
*G02B 21/36* (2006.01)
*G02B 5/04* (2006.01)

(52) U.S. Cl.
CPC .......... *G02B 26/0816* (2013.01); *G02B 21/361* (2013.01); *G02B 21/362* (2013.01); *G02B 5/04* (2013.01)

(58) Field of Classification Search
CPC .. G02B 21/18; G02B 21/362; G02B 26/0816; G02B 21/361; G02B 5/04; G02B 5/08; H04N 5/2254
USPC ............ 359/211.1–211.2, 225.1–226.1, 381, 359/388–389; 348/344
See application file for complete search history.

(56) References Cited

U.S. PATENT DOCUMENTS

| | | | |
|---|---|---|---|
| 4,143,938 A | 3/1979 | Feinbloom | |
| 4,302,087 A | 11/1981 | Reinheimer et al. | |
| 4,801,197 A | 1/1989 | Minami | |
| 6,320,696 B1 | 11/2001 | Greenberg et al. | |
| 7,071,973 B1 * | 7/2006 | Yoshioka et al. | 348/219.1 |
| 2008/0239475 A1 | 10/2008 | Hirukawa et al. | |

FOREIGN PATENT DOCUMENTS

| | | |
|---|---|---|
| DE | 3318011 A1 | 11/1984 |
| EP | 0683413 A1 | 11/1995 |
| JP | 09-186917 | 7/1997 |

OTHER PUBLICATIONS

Extended European Search Report received Jun. 26, 2013 in corresponding Application No./Patent No. 12192615.8-1562.

* cited by examiner

*Primary Examiner* — James Phan
(74) *Attorney, Agent, or Firm* — Scully, Scott, Murphy & Presser, PC

(57) ABSTRACT

Provided is an image-capturing apparatus including a connecting portion having an opening through which a beam coming from an observation device is incident; an optical-path switching portion that switches an optical path of the beam incident along an incident optical axis; image-capturing devices that capture an image of the beam passing along the switched optical path. A first image-capturing device is provided so as to be rotatable about an axis parallel to the central axis thereof. The optical-path switching portion is provided so as to be pivotable such that a reflecting surface thereof is disposed on or retracted from the incident optical axis. When the reflecting surface is retracted, the beam is incident on a second image-capturing device. When the reflecting surface is disposed, the beam is reflected by the reflecting surface and incident on at least the first image-capturing device.

11 Claims, 5 Drawing Sheets

IMAGE-CAPTURING APPARATUS

CROSS-REFERENCE TO RELATED APPLICATIONS

This application is based on Japanese Patent Application No. 2011-278680, the contents of which are incorporated herein by reference.

BACKGROUND OF THE INVENTION

1. Field of the Invention

The present invention relates to image-capturing apparatuses.

2. Description of Related Art

A known image-capturing apparatus in the related art includes two image-capturing devices and captures two types of images with the two image-capturing devices by splitting light coming from a subject (for example, see Japanese Unexamined Patent Application, Publication No. Hei 9-186917).

This image-capturing apparatus splits light using optical path splitting means, such as a half mirror, and simultaneously captures two types of images at different magnifications with the two image-capturing devices.

However, the image-capturing apparatus disclosed in Japanese Unexamined Patent Application, Publication No. Hei 9-186917 cannot capture images of all the light with only one of the image-capturing devices, whereas it can simultaneously capture two images with the two image-capturing devices.

BRIEF SUMMARY OF THE INVENTION

An aspect of the present invention provides an image-capturing apparatus including a connecting portion that is connectable to an observation device and has an opening through which a beam coming from the observation device is incident; an optical-path switching portion that switches an optical path of the beam incident along an incident optical axis passing through the opening; and a plurality of image-capturing devices that capture an image of the beam passing along the optical path switched by the optical-path switching portion. A first image-capturing device is provided so as to be rotatable about an axis parallel to the central axis of the first image-capturing device. The optical-path switching portion includes a reflecting surface and is pivotable such that the reflecting surface is disposed on or retracted from the incident optical axis. When the optical-path switching portion is pivoted to retract the reflecting surface from the incident optical axis, the beam incident along the incident optical axis is incident on a second image-capturing device. When the reflecting surface is disposed on the incident optical axis, the beam incident along the incident optical axis is reflected by the reflecting surface and is incident on at least the first image-capturing device.

DETAILED DESCRIPTION OF THE INVENTION

An image-capturing apparatus according to an embodiment of the present invention will be described below with reference to the drawings.

Figure 1:
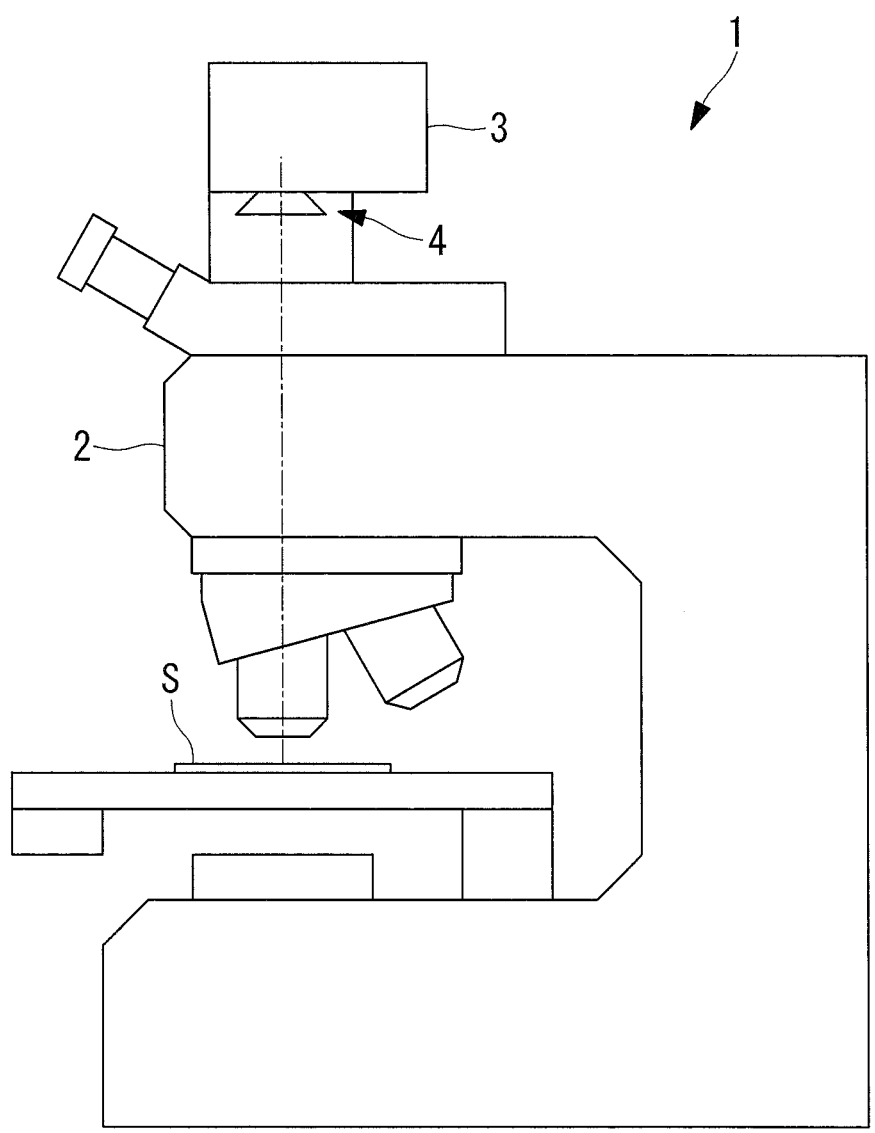
FIG. 1 is an overall schematic diagram of an image-capturing apparatus according to an embodiment of the present invention, attached to a microscope.
Figure 2:
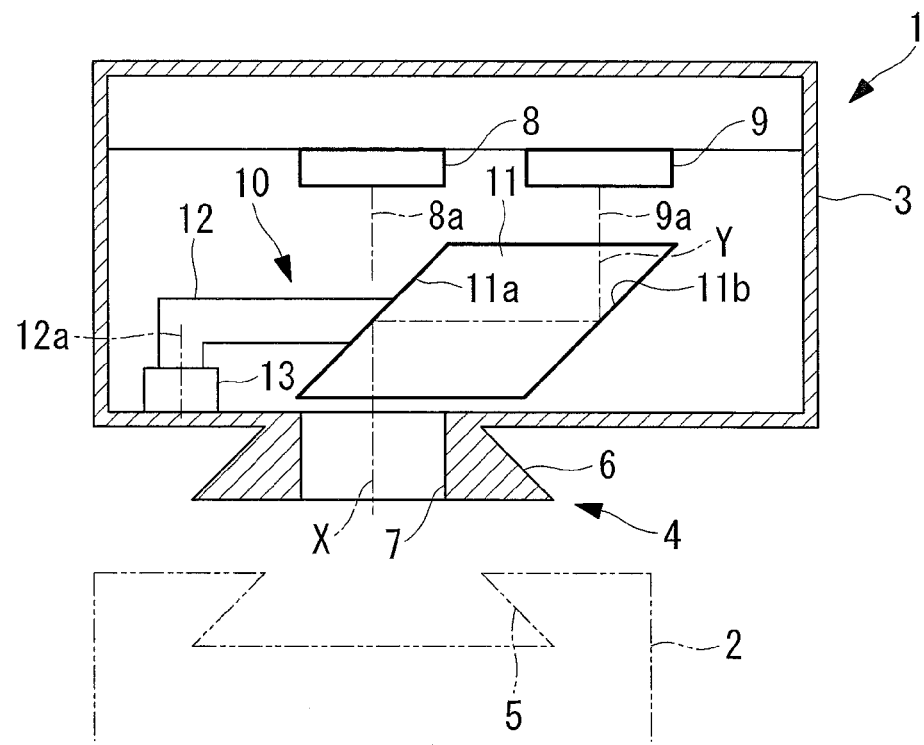
FIG. 2 is a schematic view of an internal structure of the image-capturing apparatus in FIG. 1.

An image-capturing apparatus 1 according to this embodiment is used with a microscope (observation device) 2 and, as shown in FIG. 1, includes a casing 3 and a connecting portion 4 via which the casing 3 is removably attached to the microscope 2. As shown in FIG. 2 for example, the connecting portion 4 includes a dovetail tenon 6 that fits into a dovetail groove 5 provided in the microscope 2. The connecting portion 4 is not limited to the dovetail tenon 6 and the dovetail groove 5, and any other connecting methods may be employed.

Furthermore, the image-capturing apparatus 1 according to this embodiment has an opening 7 provided in the connecting portion 4, through which light from a specimen S, collected by the microscope 2, enters the casing 3; two image-capturing devices 8 and 9 that capture images of the light entering through the opening 7 along an incident optical axis X; and optical path switching means 10 that switches between an optical path extending from the opening 7 to the image-capturing device 8 and an optical path extending from the opening 7 to the image-capturing device 9.

The two image-capturing devices 8 and 9 include, for example, a color CCD (a second image-capturing device) 8 having good color reproducibility and a monochrome CCD (a first image-capturing device) 9 having a higher sensitivity than the color CCD 8.

Hereinbelow, in this embodiment, a point projected on a light receiving surface of the color CCD 8 is referred to as an optical axis 8a, and a point projected on a light receiving surface of the monochrome CCD 9 is referred to as an optical axis 9a.

The color CCD 8 is fixed to the casing 3 such that the optical axis (central axis) 8a perpendicular to the light receiving surface thereof is aligned with the incident optical axis X extending through the opening 7 provided in the connecting portion 4.

Furthermore, the monochrome CCD 9 has an optical axis (central axis) 9a perpendicular to the light receiving surface thereof and parallel to the optical axis 8a of the color CCD 8, with a certain distance therebetween, and is attached to the casing 3 such that the rotational position about a rotation axis P parallel to the optical axis 9a (see FIG. 5) can be adjusted.

Figure 5A:
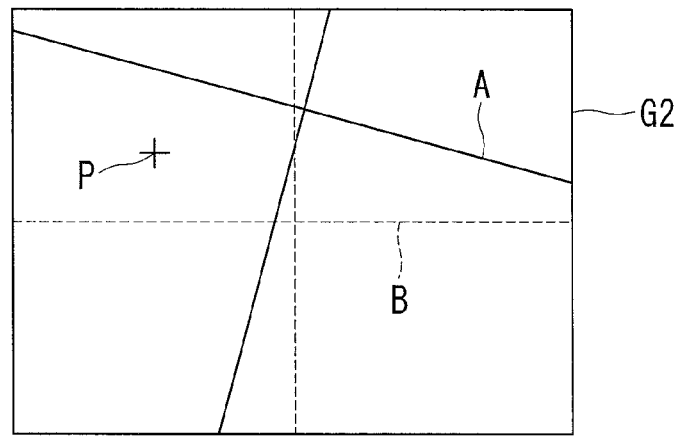
FIG. 5A shows a monochrome image captured by the image-capturing apparatus in FIG. 1, before adjusting the rotation angle of a monochrome CCD.
Figure 5B:
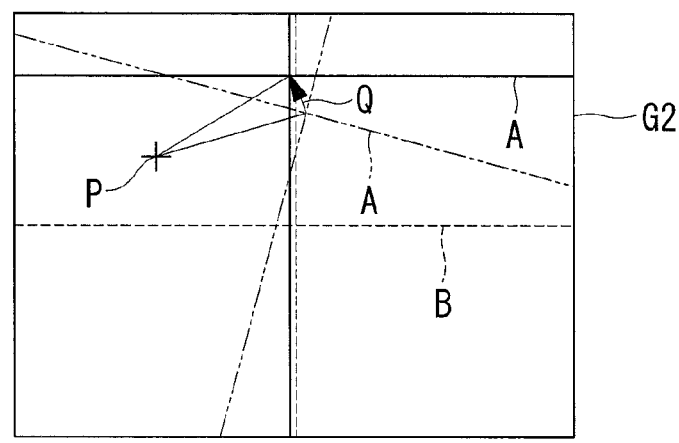
FIG. 5B shows a monochrome image captured by the image-capturing apparatus in FIG. 1, after adjusting the rotation angle of the monochrome CCD.

That is, the monochrome CCD 9 is attached to the casing 3 in such a manner that the optical axis 9a extending through the central pixel of the monochrome CCD 9 and the rotation axis P are misaligned. As shown in FIG. 5B, this rotation axis P is provided in a direction in which the position of the intersection of cross-lines A moves when the rotational position of the monochrome CCD 9 is adjusted.

The optical path switching means 10 includes a prism (an optical-path switching portion) 11 and a pivot mechanism 12 that supports the prism 11 such that the prism 11 can pivot about a pivot axis 12a parallel to the optical axis 8a of the color CCD 8 and the optical axis 9a of the monochrome CCD 9.

The prism 11 has a parallelepiped shape and has two reflecting surfaces 11a and 11b that are parallel to each other and have a certain distance therebetween.

The prism 11 deflects the incident beam by 90 degrees when the pivot mechanism 12 is moved to dispose the reflecting surface 11a of the prism 11 on the incident optical axis X of the beam incident from the opening 7, i.e., the optical axis 8a of the color CCD 8 fixed at a position aligned therewith, at an angle of 45 degrees with respect to the optical axis 8a. Because the two reflecting surfaces 11a and 11b are arranged parallel to each other with a certain distance therebetween, the reflecting surface 11b is arranged at an angle of 45 degrees with respect to the optical axis of the beam deflected by the reflecting surface 11a.

Thus, the beam deflected by the reflecting surface 11a of the prism 11 is again deflected by 90 degrees by the reflecting surface 11b. That is, the beam incident on the prism 11 is deflected twice by 90 degrees each time, i.e., is bent in a crank shape by the prism 11, and is emitted along an exit optical axis Y that is precisely parallel to the incident optical axis X.

The distance between the incident optical axis X and the exit optical axis Y of the prism 11 is designed to be equal to the distance between the optical axis 8a of the color CCD 8 and the optical axis 9a of the monochrome CCD 9.

Figure 3:
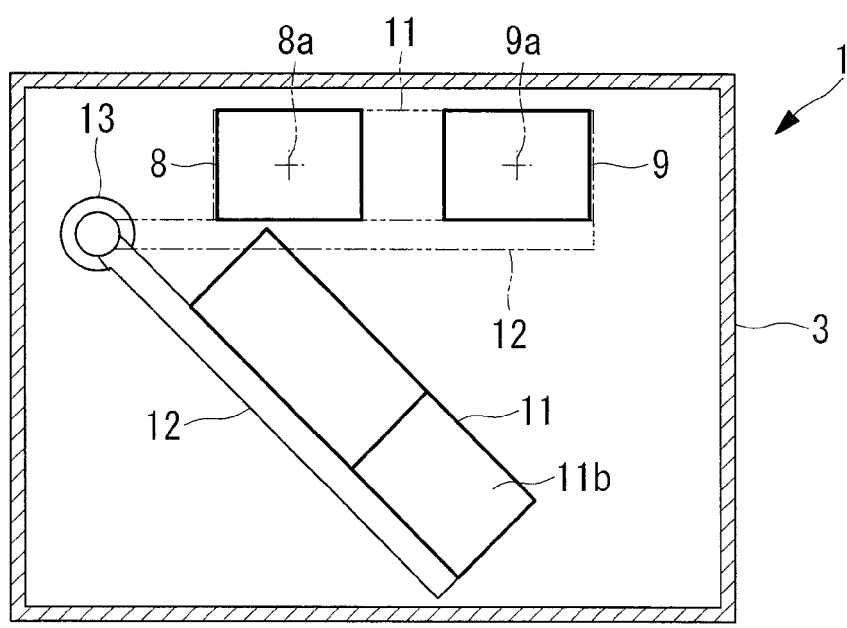
FIG. 3 is a plan view showing a pivotal movement of a prism of the image-capturing apparatus in FIG. 1.

Furthermore, the pivot mechanism 12 causes the prism 11 to pivot to move the prism 11 into or out of a space between the opening 7 and the color CCD 8, as shown in FIG. 3. The pivot mechanism 12 includes a stepping motor 13 and a control unit (not shown) that controls the stepping motor 13. The control unit stores data for causing the prism 11 to pivot to an angular position set as a result of the adjustment described below, and the control unit controls the stepping motor 13 according to the stored data.

The operation of the thus-configured image-capturing apparatus 1 according to this embodiment will be described below.

In order to capture an image of light from the specimen S, collected by the microscope 2, with the image-capturing apparatus 1 according to this embodiment, first, the image-capturing apparatus 1 is adjusted.

The image-capturing apparatus 1 is attached to the microscope 2 via the connecting portion 4, and a reference sample is observed with the microscope 2. For example, an object marked with two straight lines that are precisely orthogonal to each other (the cross-lines A) may be used as the reference sample.

Then, the pivot mechanism 12 is moved to retract the prism 11 from the space between the opening 7 and the color CCD 8 to allow light coming from the microscope 2 and entering the casing 3 through the opening 7 to be directly incident on the color CCD 8, without passing through the prism 11. Thus, a color image G1 of the reference sample is captured.

Figure 4A:
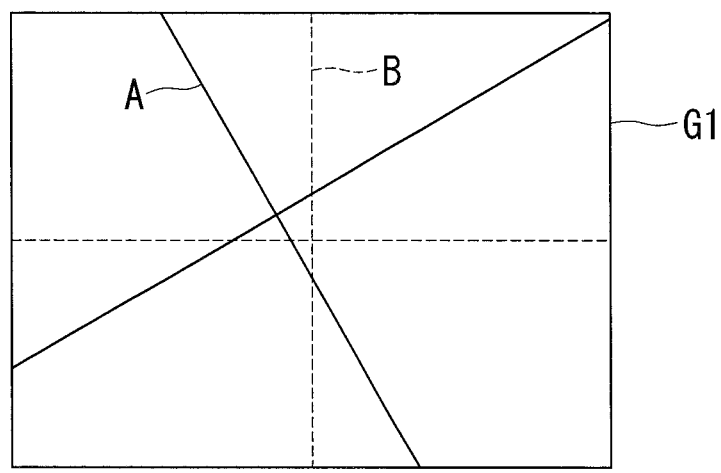
FIG. 4A shows a color image captured by the image-capturing apparatus in FIG. 1, before adjusting the position and angle of a reference sample.
Figure 4B:
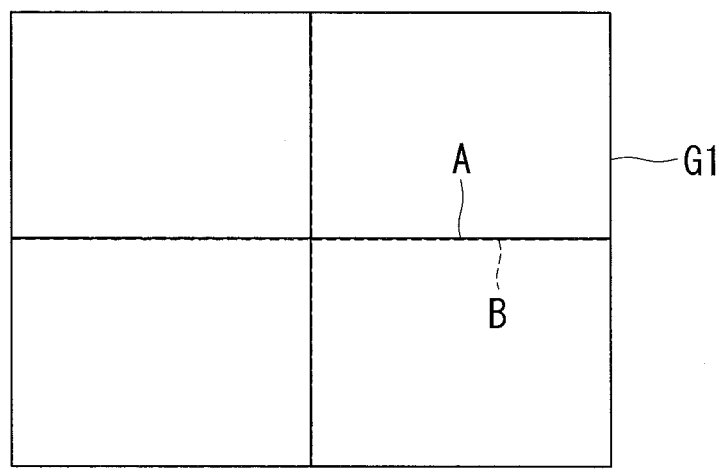
FIG. 4B shows a color image captured by the image-capturing apparatus in FIG. 1, after adjusting the position and angle of the reference sample.

Two straight lines that are orthogonal to each other and pass through the central pixel of the color CCD 8 (cross-lines B) are generated by software and superposed on the color image G1 captured by the color CCD 8. As a result, as shown in FIG. 4A, the cross-lines A on the reference sample and the cross-lines B generated by software appear in the color image G1. By adjusting the position of the reference sample, the two cross-lines A and B are aligned, as shown in FIG. 4B.

Next, the pivot mechanism 12 is moved to dispose the prism 11 in the space between the opening 7 and the color CCD 8. By doing so, light coming from the microscope 2 and entering the casing 3 through the opening 7 is deflected twice by the prism 11 and is incident on the monochrome CCD 9. Thus, a monochrome image G2 of the reference sample is captured.

Two straight lines that are orthogonal to each other and pass through the central pixel of the monochrome CCD 9 (cross-lines B) are generated by software and superposed on the monochrome image G2 captured by the monochrome CCD 9. As a result, similarly to the color image G1, the cross-lines A on the reference sample and the cross-lines B generated by software appear in the monochrome image G2, as shown in FIG. 5A.

By rotating the monochrome CCD 9 about the axis P parallel to the optical axis 9a thereof, the cross-lines B generated by software are rotated relative to the cross-lines A on the reference sample, and their rotation angles are aligned. At this time, because the rotation axis P of the monochrome CCD 9 is not aligned with the central pixel of the monochrome CCD 9, as shown in FIG. 5B, the cross-lines B rotate, and the intersection of the cross-lines A is displaced, as indicated by an arrow Q, due to the rotation of the monochrome CCD 9.

Once the straight lines constituting the two cross-lines A and B have become parallel to one another, the monochrome CCD 9 is fixed so as not to rotate relative to the casing 3.

Figure 5C:
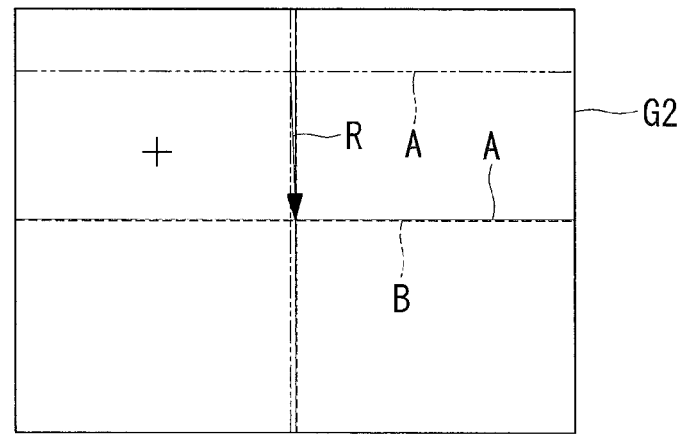
FIG. 5C shows a monochrome image captured by the image-capturing apparatus in FIG. 1, after adjusting the rotation angle of the monochrome CCD and the position of the prism.

Then, the pivot mechanism 12 is moved to pivot the prism 11. As a result, as shown in FIG. 5C, the cross-lines A on the reference sample is translated, as indicated by an arrow R, and the distance with respect to the cross-lines B, generated by software, changes.

Figure 6:
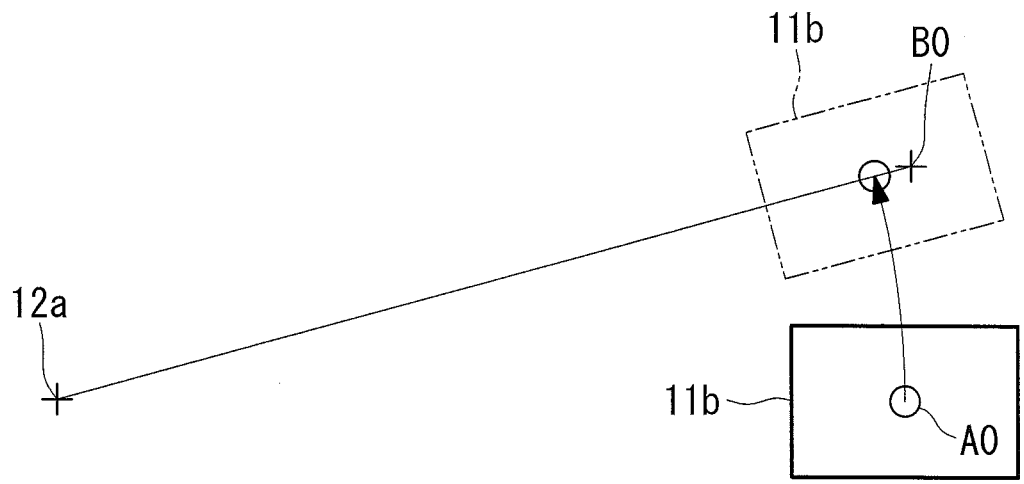
FIG. 6 shows adjustment of the position of the prism of the image-capturing apparatus in FIG. 1.

In this case, because the prism 11 of the image-capturing apparatus 1 according to this embodiment has the two parallel reflecting surfaces 11a and 11b, the cross-lines A on the reference sample are translated on the monochrome image G2 without changing the angle thereof. Then, as shown in FIG. 6, the prism 11 is rotated until an intersection A0 of the cross-lines A on the reference sample is located on a straight line passing through an intersection B0 of the cross-lines B generated by software and the rotation axis 12a of the prism 11.

Thus, the angles of the color image G1 and the monochrome image G2 are aligned, and their positional misalignment is minimized.

In the image-capturing apparatus 1 according to this embodiment, just by causing the prism 11 to pivot by moving the pivot mechanism 12, it is possible to capture the color image G1 and the monochrome image G2 in a switchable manner. In addition, the relative angles of the color image G1 and the monochrome image G2, as well as the positions thereof, can be adjusted independently by rotating the monochrome CCD 9 and the prism 11. This leads to an advantage in that adjustments to minimize the positional misalignment can be easily performed.

Furthermore, in the image-capturing apparatus 1 according to this embodiment, the optical path switching means 10 serves dual functions: to switch between the color CCD 8 and the monochrome CCD 9, and to adjust the positions of the color image G1 and the monochrome image G2. Thus, the size of the apparatus can be reduced.

By storing the adjusted angular position of the prism 11 in the control unit, the control unit can cause the stepping motor 13 to repeatedly position the prism 11 at the stored angular position.

Although the angle adjustments of the color image G1 and the reference sample and the angle and position adjustments of the monochrome image G2 and the reference sample are achieved by using the cross-lines A and B in this embodiment, any other patterns, marks, etc. may be used instead.

Furthermore, although the prism 11 is driven by the stepping motor 13, which is controlled by the control unit 14, in this embodiment, the position of the prism 11 may be manually adjusted. In such a case, to enable the prism 11 to be repeatedly positioned at the finally adjusted angular position, a stopper (not shown) that abuts against the prism 11 at that position may be provided.

Although the two reflecting surfaces 11a and 11b are arranged at an angle of 45 degrees with respect to the optical axes 8a and 9a in this embodiment, the two reflecting surfaces 11a and 11b may be disposed at any angle, as long as they are parallel to each other and not parallel to or perpendicular to the optical axes 8a and 9a.

Figure 7:
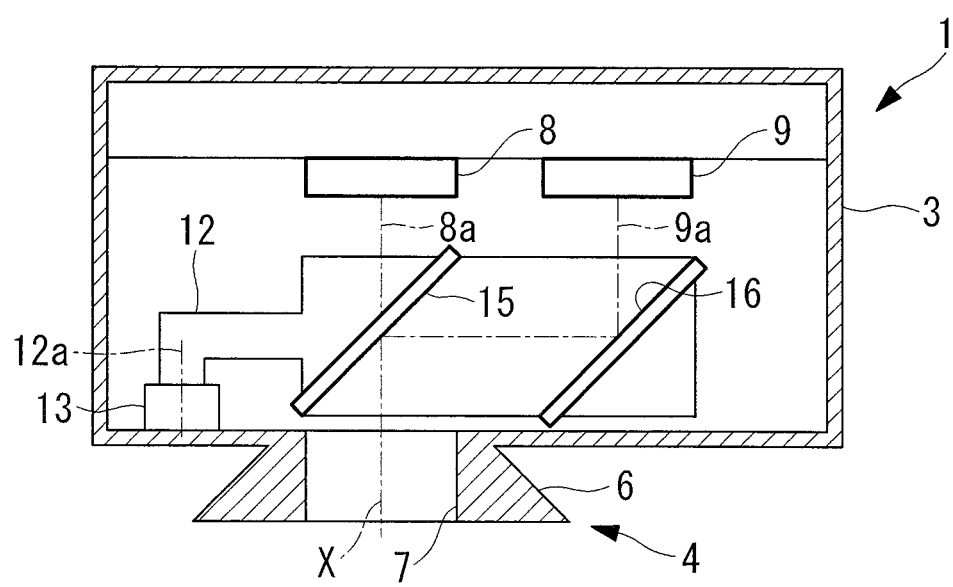
FIG. 7 is a schematic view of a modification of the image-capturing apparatus in FIG. 1.

Although the prism 11 having the two reflecting surfaces 11a and 11b is shown as an example in this embodiment, instead, as shown in FIG. 7, the pivot mechanism 12 may have two mirrors 15 and 16 that are parallel to each other.

Furthermore, instead of the mirror 15, a half mirror or a dichroic mirror may be employed. When a half mirror or a dichroic mirror is used, instead of alternative switching between image capturing by the color CCD 8 and image capturing by the monochrome CCD 9, it is possible to switch between acquisition of the color image G1 alone and simultaneous acquisition of the color image G1 and the monochrome image G2.

Although the color CCD 8 and the monochrome CCD 9 are used as the image-capturing devices, instead, both of the image-capturing devices may be the color CCDs 8 or the monochrome CCDs 9. Furthermore, CMOS image sensors may be employed instead of the CCDs.

On the basis of the embodiment described above, inventions as follows are derived.

An aspect of the present invention provides an image-capturing apparatus including a connecting portion that is connectable to an observation device and has an opening through which a beam coming from the observation device is incident; an optical-path switching portion that switches an optical path of the beam incident along an incident optical axis passing through the opening; and a plurality of image-capturing devices that capture an image of the beam passing along the optical path switched by the optical-path switching portion. A first image-capturing device is provided so as to be rotatable about an axis parallel to the central axis of the first image-capturing device. The optical-path switching portion includes a reflecting surface and is pivotable such that the reflecting surface is disposed on or retracted from the incident optical axis. When the optical-path switching portion is pivoted to retract the reflecting surface from the incident optical axis, the beam incident along the incident optical axis is incident on a second image-capturing device. When the reflecting surface is disposed on the incident optical axis, the beam incident along the incident optical axis is reflected by the reflecting surface and is incident on at least the first image-capturing device.

According to this aspect, when the connecting portion is connected to the observation device, the beam coming from the observation device enters the image-capturing apparatus along the incident optical axis through the opening provided in the connecting portion. When the optical-path switching portion is pivoted to retract the reflecting surface from the incident optical axis, the beam incident along the incident optical axis is incident on the second image-capturing device, and a second image is captured.

Furthermore, when the optical-path switching portion is pivoted to dispose the reflecting surface on the incident optical axis, the beam incident along the incident optical axis is deflected by the reflecting surface and is incident on the first image-capturing device, and a first image is captured.

In this case, in order to reduce misalignment between the two captured images, first, the first image-capturing device is rotated about the axis parallel to the central axis of the first image-capturing device, so that the rotation angles of the first and second image-capturing devices are precisely aligned. As a result, the rotation angles of the two images captured by the first and second image-capturing devices are precisely aligned.

Then, the optical-path switching portion is pivoted by a very small angle to rotate the first image-capturing device. By doing so, the misalignment between the two images captured by the first and second image-capturing devices can be reduced, while keeping the precisely adjusted rotation angles of the two images in alignment. That is, because the rotation angles and positions of the image-capturing devices can be independently adjusted, the misalignment between the captured images can be easily adjusted.

In the above-described aspect, the optical-path switching portion may be positioned such that an exit optical axis of the beam exiting the reflecting surface when the reflecting surface is disposed on the incident optical axis is located in a plane including the central axis of the first image-capturing device and a pivot axis of the optical-path switching portion.

With this configuration, the exit optical axis of the beam exiting the reflecting surface of the optical-path switching portion can be located closest to the central axis of the first image-capturing device.

Another aspect of the present invention is an image-capturing apparatus including a connecting portion that is connectable to an observation device and has an opening through which a beam coming from the observation device is incident; an optical-path switching portion that switches an optical path of the beam incident along an incident optical axis passing through the opening; and two image-capturing devices that capture an image of the beam passing through any one of the optical paths switched by the optical-path switching portion. A first image-capturing device is disposed on the incident optical axis, and a second image-capturing device is provided so as to be rotatable about an axis parallel to the incident optical axis. The optical-path switching portion has two reflecting surfaces that are parallel to each other and have a certain distance therebetween and is pivotable about a pivot axis parallel to the incident optical axis such that one of the reflecting surfaces is disposed on or retracted from the incident optical axis. When the optical-path switching portion is pivoted to retract the reflecting surface from the incident optical axis, the beam incident along the incident optical axis is incident on the first image-capturing device, and when the reflecting surface is disposed on the incident optical axis, the beam incident along the incident optical axis is reflected twice by the two reflecting surfaces and is incident on the second image-capturing device.

According to this aspect, when the connecting portion is connected to the observation device, the beam coming from the observation device enters the image-capturing apparatus along the incident optical axis through the opening provided in the connecting portion. When the optical-path switching portion is pivoted to retract one of the reflecting surfaces from the incident optical axis, the beam incident along the incident optical axis is incident on one of the reflecting surfaces disposed on the incident optical axis, and a first image is captured.

Furthermore, when the optical-path switching portion is pivoted to dispose one of the reflecting surfaces on the incident optical axis, the beam incident along the incident optical axis is deflected twice by the two reflecting surfaces. Because the two reflecting surfaces are parallel to each other with a certain distance therebetween, the beam deflected twice is incident on the second image-capturing device along an optical axis parallel to the incident optical axis, and a second image is captured.

In this case, in order to reduce the misalignment between the two captured images, first, the second image-capturing device is rotated about the axis parallel to the incident optical axis so that the rotation angles of the two image-capturing devices are precisely aligned. As a result, the rotation angles of the two images captured by the two image-capturing devices are precisely aligned.

Then, the optical-path switching portion is pivoted by a very small angle. Because the two reflecting surfaces of the optical-path switching portion are parallel to each other, the beam reflected twice by the reflecting surfaces and incident on the second image-capturing device is not rotated relative to the beam incident along the incident optical axis, regardless of the pivoting of the optical-path switching portion. That is, by pivoting the optical-path switching portion, an image-capturing area of the second image-capturing device can be translated in a direction perpendicular to the incident optical axis.

As a result, the center of the image can be brought toward the incident optical axis of the second image-capturing device, while keeping the rotation angles of the two images, which are precisely adjusted by rotating the second image-capturing device, in alignment. That is, because the rotation angles and positions of the image-capturing devices can be independently adjusted, the misalignment between the captured images can be easily adjusted.

Furthermore, in the above-described aspect, the plurality of image-capturing devices may have different characteristics.

With this configuration, due to the two image-capturing devices having different characteristics, such as monochrome and color, it is possible to switch between observation with only a color image and observation with only a monochrome image, and the misalignment between the images occurring when the images are switched can be reduced, thereby increasing the ease of observation.

Furthermore, in the above-described aspect, the image-capturing apparatus may further include a motor that causes the optical-path switching portion to pivot; and a control unit that causes the motor to pivot within a predetermined pivot angle range.

With this configuration, due to the control unit causing the motor to pivot the optical-path switching portion, the optical-path switching portion can be repeatedly pivoted between two positions where the rotation angles and the positions are precisely adjusted.

What is claimed is:

1. An image-capturing apparatus comprising:
    a connecting portion that is connectable to an observation device and has an opening through which a beam coming from the observation device is incident;
    an optical-path switching portion that switches an optical path of the beam incident along an incident optical axis passing through the opening; and
    a plurality of image-capturing devices that capture an image of the beam passing along the optical path switched by the optical-path switching portion, wherein
    a first image-capturing device is provided so as to be rotatable about an axis parallel to the central axis of the first image-capturing device,
    the optical-path switching portion includes a reflecting surface and is pivotable such that the reflecting surface is disposed on or retracted from the incident optical axis, and
    when the optical-path switching portion is pivoted to retract the reflecting surface from the incident optical axis, the beam incident along the incident optical axis is incident on a second image-capturing device, and when the reflecting surface is disposed on the incident optical axis, the beam incident along the incident optical axis is reflected by the reflecting surface and is incident on at least the first image-capturing device.

2. The image-capturing apparatus according to claim 1, wherein the optical-path switching portion is positioned such that an exit optical axis of the beam exiting the reflecting surface when the reflecting surface is disposed on the incident optical axis is located in a plane including the central axis of the first image-capturing device and a pivot axis of the optical-path switching portion.

3. An image-capturing apparatus according to claim 2, wherein
    the first image-capturing device is disposed such that the central axis thereof is parallel to the incident optical axis,
    the second image-capturing device is disposed on the incident optical axis,
    the optical-path switching portion has two reflecting surfaces that are parallel to each other and have a certain distance therebetween and is pivotable about the pivot axis parallel to the incident optical axis such that one of the reflecting surfaces is disposed on or retracted from the incident optical axis, and
    when the optical-path switching portion is pivoted to retract one of the reflecting surfaces from the incident optical axis, the beam incident along the incident optical axis is incident on the second image-capturing device, and when the reflecting surface is disposed on the incident optical axis, the beam incident along the incident optical axis is reflected twice by the two reflecting surfaces and is incident on the first image-capturing device.

4. The image-capturing apparatus according to claim 3, further comprising:
    a motor that causes the optical-path switching portion to pivot; and
    a control unit that causes the motor to pivot within a predetermined pivot angle range.

5. The image-capturing apparatus according to claim 2, wherein the plurality of image-capturing devices have different characteristics.

6. The image-capturing apparatus according to claim 2, further comprising:
    a motor that causes the optical-path switching portion to pivot; and
    a control unit that causes the motor to pivot within a predetermined pivot angle range.

7. An image-capturing apparatus according to claim 1, wherein
    the first image-capturing device is disposed such that the central axis thereof is parallel to the incident optical axis, the second image-capturing device is disposed on the incident optical axis, the optical-path switching portion has two reflecting surfaces that are parallel to each other and have a certain distance therebetween and is pivotable about the pivot axis parallel to the incident optical axis such that one of the reflecting surfaces is disposed on or retracted from the incident optical axis, and when the optical-path switching portion is pivoted to retract one of the reflecting surfaces from the incident optical axis, the beam incident along the incident optical axis is incident on the second image-capturing device, and when the reflecting surface is disposed on the incident optical axis, the beam incident along the incident optical axis is reflected twice by the two reflecting surfaces and is incident on the first image-capturing device.

8. The image-capturing apparatus according to claim 7, wherein the plurality of image-capturing devices have different characteristics.

9. The image-capturing apparatus according to claim 7, further comprising:

a motor that causes the optical-path switching portion to pivot; and a control unit that causes the motor to pivot within a predetermined pivot angle range.

10. The image-capturing apparatus according to claim 1, wherein the plurality of image-capturing devices have different characteristics.

11. The image-capturing apparatus according to claim 1, further comprising:

a motor that causes the optical-path switching portion to pivot; and a control unit that causes the motor to pivot within a predetermined pivot angle range.

\* \* \* \* \*